(12) United States Patent
Jaasma

(10) Patent No.: US 9,291,109 B2
(45) Date of Patent: Mar. 22, 2016

(54) FUEL SUPPLY SYSTEM AND HIGH-PRESSURE PUMP FOR COMBUSTION ENGINE

(75) Inventor: Servatius Alfons Maria Jaasma, Eindhoven (NL)

(73) Assignee: VIALLE GROUP B.V., Eindhoven (NL)

( * ) Notice: Subject to any disclaimer, the term of this patent is extended or adjusted under 35 U.S.C. 154(b) by 677 days.

(21) Appl. No.: 13/502,992

(22) PCT Filed: Nov. 5, 2010

(86) PCT No.: PCT/NL2010/050738
§ 371 (c)(1),
(2), (4) Date: Jul. 16, 2012

(87) PCT Pub. No.: WO2011/059316
PCT Pub. Date: May 19, 2011

(65) Prior Publication Data
US 2012/0312280 A1    Dec. 13, 2012

(30) Foreign Application Priority Data

Nov. 12, 2009  (NL) ..................................... 2003791

(51) Int. Cl.
*F02M 21/08*    (2006.01)
*F02M 55/02*    (2006.01)
(Continued)

(52) U.S. Cl.
CPC .......... *F02D 19/022* (2013.01); *F02D 19/0647* (2013.01); *F02D 19/0676* (2013.01);
(Continued)

(58) Field of Classification Search
CPC ....... F02M 21/02; F02M 37/20; F02M 37/00; F02M 63/02; F02M 55/00; F02M 59/10; F02M 21/0245; F02M 37/0064; F02M 55/002; F02D 19/06; F02D 19/0647; F02D 19/0676; F02D 19/0684; F02D 19/0681; F02D 19/0694; F02D 19/10

USPC ......... 701/103, 104, 102, 110, 112, 114, 105, 701/107; 137/202, 588, 587, 544, 14, 255, 137/517, 565.22, 571, 599.18; 180/219; 239/584, 417.5, 34, 57; 60/285, 286, 60/39.281, 274, 295, 301, 602, 793; 417/151, 364

See application file for complete search history.

(56) References Cited

U.S. PATENT DOCUMENTS 3,540,419 A  * 11/1970  Fox ..................... F02D 19/0631
                                                    123/27 GE
4,545,356 A  * 10/1985  Casey ..................... F02B 43/00
                                                    123/1 A
(Continued)

FOREIGN PATENT DOCUMENTS

EP          1010886 A1     3/1999
JP       2003 056410 A     2/2003
(Continued)

*Primary Examiner* — Hung Q Nguyen
*Assistant Examiner* — John Bailey
(74) *Attorney, Agent, or Firm* — Knobbe, Martens, Olson & Bear, LLP

(57) ABSTRACT

The invention relates to a fuel supply system (1) for injecting liquefied vapor under high pressure, such as liquid petroleum gas (LPG), into a combustion chamber (3-6) of an internal combustion engine (2). The fuel supply system (1) comprises a fuel supply for liquefied vapor connected to a high-pressure pump (11) via a duct. The high-pressure pump (11) has a high-pressure chamber (105) which is embodied thereby to increase the pressure of the liquefied vapor. A high-pressure discharge of the high-pressure pump (11) is connected to a high-pressure rail (7) which comprises one or several injectors for injecting liquefied vapor into a combustion chamber. According to the invention, the fuel supply system is provided with a discharge F unit (20) for purging fuel, in particular fuel vapor, between the high-pressure chamber and the combustion chamber.

19 Claims, 3 Drawing Sheets

(51) Int. Cl.
*F02M 59/44* (2006.01)
*F02M 37/20* (2006.01)
*F02M 63/02* (2006.01)
*F02D 19/02* (2006.01)
*F02D 19/06* (2006.01)
*F02M 37/00* (2006.01)
*F02M 55/00* (2006.01)
*F02M 59/10* (2006.01)
*F02M 21/02* (2006.01)

(52) U.S. Cl.
CPC ........ *F02D19/0681* (2013.01); *F02D 19/0684* (2013.01); *F02D 19/0694* (2013.01); *F02M 21/0245* (2013.01); *F02M 37/0064* (2013.01); *F02M 37/20* (2013.01); *F02M 55/002* (2013.01); *F02M 59/102* (2013.01); *F02M 63/0225* (2013.01); *Y02T 10/32* (2013.01); *Y02T 10/36* (2013.01)

(56) References Cited

U.S. PATENT DOCUMENTS

| | | | | |
|---|---|---|---|---|
| 4,632,083 A * | 12/1986 | Reggiani | ............ | F02B 43/00 123/27 GE |
| 5,010,868 A * | 4/1991 | Clements | ............ | F02B 43/00 123/527 |
| 5,033,444 A * | 7/1991 | Kaufman | ............ | F02B 43/00 123/1 A |
| 5,291,869 A * | 3/1994 | Bennett | ............ | F02M 69/465 123/41.31 |
| 5,325,838 A * | 7/1994 | Bennett | ............ | F02B 43/00 123/41.31 |
| 5,377,645 A * | 1/1995 | Moore | ............ | F02B 43/00 123/478 |
| 5,479,906 A * | 1/1996 | Collie | ............ | F02M 21/0212 123/304 |
| 5,873,354 A * | 2/1999 | Krohn | ............ | F02M 31/125 123/549 |
| 5,887,574 A * | 3/1999 | Smith | ............ | F02D 19/0647 123/527 |
| 5,894,832 A * | 4/1999 | Nogi | ............ | F02D 9/10 123/179.15 |
| 6,067,972 A * | 5/2000 | Jaasma | ............ | F02D 19/0605 123/549 |
| 6,155,235 A * | 12/2000 | Kilgore | ............ | F02M 37/0041 123/467 |
| 6,227,173 B1 * | 5/2001 | Bennett | ............ | F02B 43/00 123/468 |
| 6,959,697 B2 * | 11/2005 | Kojima | ............ | F02D 19/023 123/467 |
| 7,162,995 B2 * | 1/2007 | Munshi | ............ | F02D 19/024 123/27 GE |
| 7,225,763 B2 * | 6/2007 | Ritter | ............ | F02D 19/0607 123/27 GE |
| 7,302,936 B2 * | 12/2007 | Stolarz | ............ | B60K 15/01 123/468 |
| 7,527,035 B2 * | 5/2009 | Schroeder | ............ | F02M 55/00 123/446 |
| 7,822,534 B2 * | 10/2010 | Matsubara | ............ | F01N 3/0807 123/198 DB |
| 2001/0003977 A1 * | 6/2001 | Hayashi | ............ | F02D 41/0027 123/480 |
| 2002/0092505 A1 * | 7/2002 | Rembold | ............ | F02M 37/0052 123/464 |
| 2003/0216883 A1 | 11/2003 | Lee | | |
| 2005/0034710 A1 * | 2/2005 | Crary | ............ | F02M 33/08 123/457 |
| 2006/0021604 A1 * | 2/2006 | Kaiser | ............ | F02D 19/023 123/526 |
| 2006/0042606 A1 * | 3/2006 | Van Dyke | ............ | B60K 15/03006 123/527 |
| 2006/0054141 A1 * | 3/2006 | Nozaki | ............ | F02D 41/042 123/514 |
| 2006/0124112 A1 * | 6/2006 | Turner | ............ | F02M 21/0278 123/516 |
| 2006/0231080 A1 * | 10/2006 | Tomatsuri | ............ | F02D 41/062 123/516 |
| 2007/0157912 A1 * | 7/2007 | Ritter | ............ | F02B 29/0418 123/679 |
| 2008/0271707 A1 * | 11/2008 | Nozaki | ............ | F02D 33/006 123/446 |
| 2010/0288240 A1 * | 11/2010 | Johnston | ............ | F02D 19/0668 123/515 |
| 2010/0294250 A1 * | 11/2010 | Jauss | ............ | F02D 19/0647 123/511 |

FOREIGN PATENT DOCUMENTS

JP 2008248713 A 10/2008
NL 1 031 682 C2 1/2009
WO WO2009/110792 A1 11/2009

\* cited by examiner

FUEL SUPPLY SYSTEM AND HIGH-PRESSURE PUMP FOR COMBUSTION ENGINE

The invention relates to a fuel supply system for supplying a fuel such as liquid petroleum gas (LPG) under high pressure to a combustion chamber. The invention also relates to a high-pressure pump for combustion engine.

DE 10 2005 054 451 discloses a fuel supply system, in which the high-pressure pump is provided with a leak on the low-pressure part for cooling the pump by means of the supplied fuel, LPG, during use.

It is a problem with the known fuel supply systems that when the combustion engine, and thus the fuel supply system, is switched off, the LPG present in the fuel lines can heat up.

JP 2003056410 discloses a fuel-injection system which, as in the present invention, uses a low-pressure pump which is situated in or near the tank for the fuel and a high-pressure pump which is arranged near the engine. In this Japanese document, fuel is recirculated from the low-pressure part of the high-pressure pump.

Due to evaporation, restarting, in particular starting after a short interval of approximately a quarter of an hour, may be difficult because of the vapour which is present. It has been found that the system as described in JP 2003056410 does not guarantee an engine will start in all circumstances.

It is an object of the invention to provide a system in which this problem has been reduced and an engine can start directly in all circumstances.

This object is achieved according to the invention with the features of claim 1. According to the present invention, fluid is caused to circulate in the high-pressure part of the high-pressure pump. It has been found that the formation of gas from liquid LPG can not only take place in the low-pressure part, but also in the high-pressure part, that is to say in the high-pressure chamber of the high-pressure pump, the lines to the injectors and inside the injectors. Until now, it was thought that the pressure in this part would be sufficiently high to prevent the formation of gas there and thus to prevent blockage of the system.

According to the present invention, gaseous constituents have been removed from the high-pressure chamber of the high-pressure pump by flushing it. Such flushing is (partly) effected by means of the upstream low-pressure pump.

According to an embodiment of the invention, the fuel supply system is provided with a discharge unit for discharging fuel which is present therein, in particular fuel vapour, between the high-pressure chamber and the combustion chamber. Since fuel can be discharged from the high-pressure parts of the fuel system, it is possible to remove fuel vapour from those parts in order to improve the performance during start-up.

According to one aspect, the discharge unit is at least arranged to discharge fuel from those parts of the fuel supply system which are situated downstream of the high-pressure pump in a non-operative or non-fuel-consuming state of the combustion engine. Discharging takes place while the internal combustion engine is not running and no combustion is taking place. Discharging takes place, in particular, just before the combustion engine is started up again. In one embodiment, the discharge unit is designed to discharge vaporous fuel from the high-pressure chamber at least before or during start-up.

In a particular embodiment, the discharge device only operates temporarily. This is achieved by means of a control unit. It is particularly expedient to switch the discharge unit on during the pre start phase. In a particular embodiment, a processing unit of the fuel system is connected to the discharge unit in order to switch the latter on and off during the pre start phase. The pre start phase can be determined by means of a suitable actuator, for example connected to a door system of the vehicle in which the internal combustion engine is fitted. When the door system is opened from the closed state, this is an indication that the internal combustion engine will possibly be used in the near future and this indication can be used to start the pre start phase. The pre start phase can be switched on for a limited time. According to the invention, the pre start phase comprises discharging the fuel which has become vaporous from the high-pressure chamber.

According to an aspect, the discharge unit is embodied to discharge the fuel from the high-pressure chamber of the high-pressure pump. Due to the fact that a dedicated discharge unit is provided for the discharging of fuel vapour from the high-pressure chamber, the high-pressure chamber can be cleared of any vapour present, which is replaced with or flushed with liquid petroleum gas. It has been found that in particular the gas which is present in the high-pressure chamber leads to the starting problems mentioned above and that a discharge unit which is suitable for the purpose significantly reduces the starting problems.

In an embodiment, the discharge unit is connected to the fuel supply. The discharge unit thus forms a return for the fuel. The vaporous fuel can be fed back to the fuel supply.

According to a further advantageous embodiment of the present invention, a non-return valve is provided in the connection between the discharge unit and the various injectors which functions in such a way that pressure which has built up downstream of the discharge unit and the non-return valve does not drop, or does so to a lesser degree, when the pressure in the discharge unit according to the present invention is reduced, as a result of which it is not necessary to fill the lines (fuel part and injectors) again.

In an embodiment, the discharge unit is embodied to set the resistance of the discharging aperture in a controllable manner. In particular, choking of the discharging aperture can be adjusted. A particular embodiment comprises a closable discharging aperture which results in an adjustable discharge unit which can have various operating modes. Thus, it becomes possible in particular to cause the discharge unit to operate differently during start-up of the internal combustion engine than at other times. In particular, the resistance in the discharging aperture is reduced during or before the start-up, in particular during the pre start phase.

In an embodiment, the high-pressure pump has a non-return valve which is arranged downstream of the high-pressure chamber, the non-return valve being connected to a control unit for thereby actuating the non-return valve. In particular, it is possible to produce a non-return valve which operates differently during the pre start or start-up of the engine than during normal use of the fuel supply system and the combustion engine. The non-return valve is embodied to generate a certain pressure with the high-pressure pump and only allow fuel through, downstream to the high-pressure rail, when the preset pressure has been reached, in particular by the pump action in the high-pressure chamber. According to the invention, this non-return valve can be controlled in such a manner that this valve is opened during the pre start or start-up. This makes it possible to discharge the gas present in the high-pressure chamber.

In another embodiment, the discharge unit is arranged upstream from the non-return valve. As a result thereof, a leak from the high-pressure chamber is present. Any vapour present can be discharged from the high-pressure chamber during the pre start phase of the start-up.

It is advantageous to also provide a return line which is connected to the low-pressure part of the high-pressure pump and connected to the fuel supply. As a result thereof, it is possible to provide a fuel system which is embodied for supplying a certain volume of fuel to the high-pressure pump, while the high-pressure pump is embodied for pumping a smaller volume, and the remaining volume can be discharged via the return line of the high-pressure pump.

In a particular embodiment, the discharge unit comprises a discharge line which is connected to the return line.

It is furthermore advantageous if the discharge unit comprises a three/two valve. The three/two valve is a controllable valve which has two operating modes. In the first mode, flow from the low-pressure part to the fuel supply is prevented and flow through the discharge line to the fuel supply is allowed. In the second mode, flow from the low-pressure part to the fuel supply is allowed, while flow through the discharge line to the fuel supply is prevented. In particular, flow from the low-pressure part is throttled in the second mode. This results in a controllable system, in which during, for example, the start-up phase or pre start phase, the discharging of vapour from the high-pressure part, in particular the high-pressure chamber of the pump, is possible, while in the normal mode only purging from the low-pressure part is allowed. The controllable valve, preferably the 3/2 valve, ensures that the discharge unit can be switched on/off. This switching on/off and the switching between the modes of the controllable valve can take place just before or during start-up of the combustion engine.

According to a further embodiment, the discharge unit comprises a leak opening which is connected to the high-pressure chamber and is embodied to allow a continuous flow of liquid vapour through the high-pressure chamber during operation of the combustion engine.

Various embodiments are possible without departing from the scope of the invention. The scope of protection is by no means limited to the illustrated embodiments. Although the invention will now be described with reference to the attached claims, the scope of protection is by no means only limited to the embodiments according to the claims. Other (partial) aspects of embodiments which have been illustrated in the present application and in which an isolated advantage is indicated or obviously present may be the subject of divisional patent applications.

The invention will be described further with reference to the attached drawings which show examples of embodiments of methods and devices according to the invention, in which.

Figure 1:
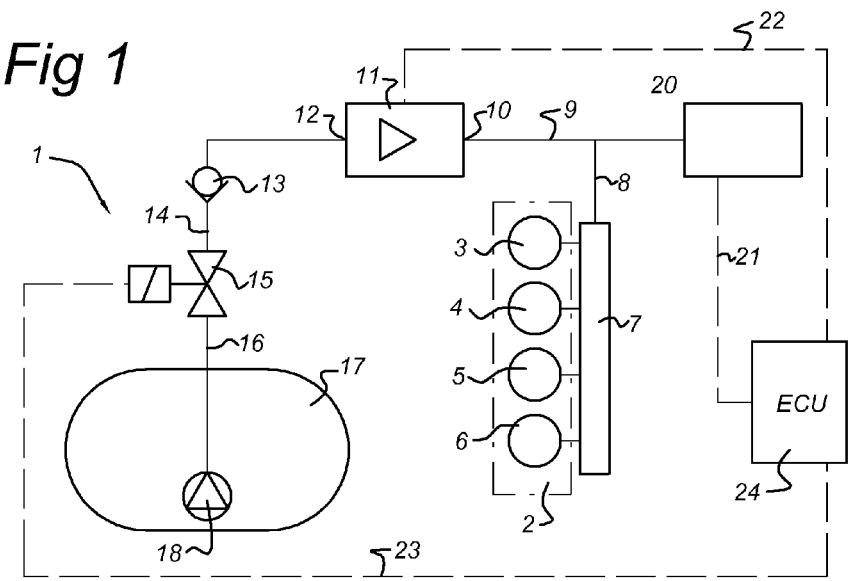
FIG. 1 shows a diagrammatic view of a fuel supply system according to a first embodiment.

FIG. 1 diagrammatically shows a fuel supply system 1. Via suitable lines, the fuel is finally supplied to the combustion engine 2 which has four combustion chambers 3-6 in the illustrated embodiment. The arrangement of the combustion chamber with pistons and the like will be known to those skilled in the art.

Each combustion chamber 3-6 is connected to the high-pressure rail 7, illustrated diagrammatically, and may comprise injectors (not shown). Via lines 8 and 9, the high-pressure rail is connected to an outlet 10 of high-pressure pump 11 which is illustrated diagrammatically. The high-pressure rail may also be directly connected to the outlet 10.

High-pressure pump 11 is embodied to bring the fuel supplied to inlet 12 to a suitable high pressure, for example 40, preferably 50 bar and higher, and supply it to the HP-rail 7 for injection into the combustion chamber.

The high-pressure pump 11 can be controlled by a fuel control unit 24, such as an ECU, so that a suitable amount of fuel is taken to the high-pressure rail 7 and thus into the combustion chambers 3-6. The ECU 24 may be connected to the injectors. The electronic connection 22 is illustrated diagrammatically.

In an embodiment, the flow rate of the high-pressure pump 11 is adjustable. In one embodiment, the outlet pressure of the high-pressure pump 11 is adjustable. In one embodiment, the ECU can control these parameters of the high-pressure pump 11.

Via a non-return valve 13 and line 14, inlet 12 of the high-pressure pump 11 is connected to a controllable valve 15 and, via a further line 16, to the inside of a fuel supply 17 which includes a pump 18.

In a preferred embodiment of the invention, the fuel supply 17 is a liquid petroleum gas container (LPG tank) 17 which is kept under pressure.

The controllable valve 15 is, for example, also connected to a central control unit 24, in this case via a diagrammatically illustrated connection 23. By means thereof, the amount of fuel to be dispensed by the fuel supply to the combustion chambers 3-6 is controlled in accordance with the wishes of the user.

According to an aspect of the invention, the illustrated fuel supply system 1 is provided with a diagrammatically illustrated discharge unit 20 which is connected to a part of the fuel supply system downstream of the high-pressure pump 11, in the illustrated embodiment to the line 8, 9 between the high-pressure pump 11 and the high-pressure rail 7.

In another embodiment, the discharge unit 20 may be directly connected to the high-pressure pump 11 and/or be part thereof, and in another embodiment, the discharge unit 20 may be directly connected to and form part of the high-pressure rail 7.

It is possible to discharge part of the fuel to the outlet 10 of the high-pressure pump 11, that is to say the high-pressure part of the fuel system 1, via the discharge unit 20.

The discharge unit 20 is embodied to discharge fuel vapour. Such discharging may take place, for example, temporarily.

In one embodiment, fuel vapour may be present in the high-pressure part of the fuel system 1. This occurs in particular after the engine 2 has been switched off and the heat present in the parts of the fuel supply system of the combustion engine will evaporate the liquidized vapour by heating. If attempts are then made to start the engine 2 again, for example after a pause of 10 or 15 minutes, these will hardly be successful, if at all, due to the vapour which is present in the high-pressure rail 7, lines 8, 9 and in the high-pressure part of the high-pressure pump 10.

According to the invention, preferably a short process, that is to say lasting a few seconds, is carried out in order to partially discharge the fuel vapour which is present. Discharge unit 20 is switched on for this limited period of time. In one embodiment, fuel is taken to the high-pressure pump 11 and transferred by pumping. At the same time, discharge unit 20 is opened and the fuel which is present in the lines 8, 9 and high-pressure rail 7 can be discharged via the discharge 20 in order to be replaced, for example by flushing, with new fuel, liquid, from the fuel supply 17.

In an embodiment, the discharge unit 20 is also embodied to discharge liquid fuel from the high-pressure parts of the fuel supply system 1.

It has been found to be particularly problematic to eliminate the vapour present in the pump 11, in particular the fuel vapour which is present in the high-pressure part of the high-pressure pump 11, during start-up. Especially the vapour present in the high-pressure pump and in particular in the high-pressure part of the pump was found to be difficult to flush out with new fuel. By now providing a discharge unit 20 by means of which, at low resistance, the vapour is given a discharge, new fuel can be introduced into the high-pressure chamber of the high-pressure pump 11 and then pumped to the high-pressure part.

In an embodiment of the invention, discharge unit 20 can also be switched on during "normal" operation of the internal combustion engine 2 (that is to say supply fuel for combustion) and fuel supply system 1. When high-pressure pump 11 is set to pump a greater volume of fuel than is required, this excess of fuel can be removed from the high-pressure rail 7 and/or lines 8, 9 by means of the discharge unit 20.

In an embodiment, the discharge unit 20 is connected to a canister for (temporarily) holding the LPG. In another embodiment, the discharge unit 20 is connected to the fuel supply 17, thus forming a return line. The vapour discharged from downstream part of the high-pressure pump 11 can then be returned.

Discharge unit 20 is connected 21 to the central processing unit/ECU 24, as a result of which the discharge unit 20 can be actuated to operate in the various modes. The ECU will, in particular, be capable of detecting, for example via suitable detectors or sensors, that LPG is possibly present in the HP-rail 7, for example because the ECU 24 has recorded that LPG was being supplied to the engine when it was switched off. From these data, it is possible to determine whether said LPG has now evaporated, for example because the engine will be restarted within 5 to 30 minutes since it was switched off, and it is then possible to temporarily switch on the discharge unit 20, if desired for an adjustable period of time adapted to the amount of vapour which may be present, in order to discharge said vapour from the part situated downstream of the high-pressure pump.

Figure 2:
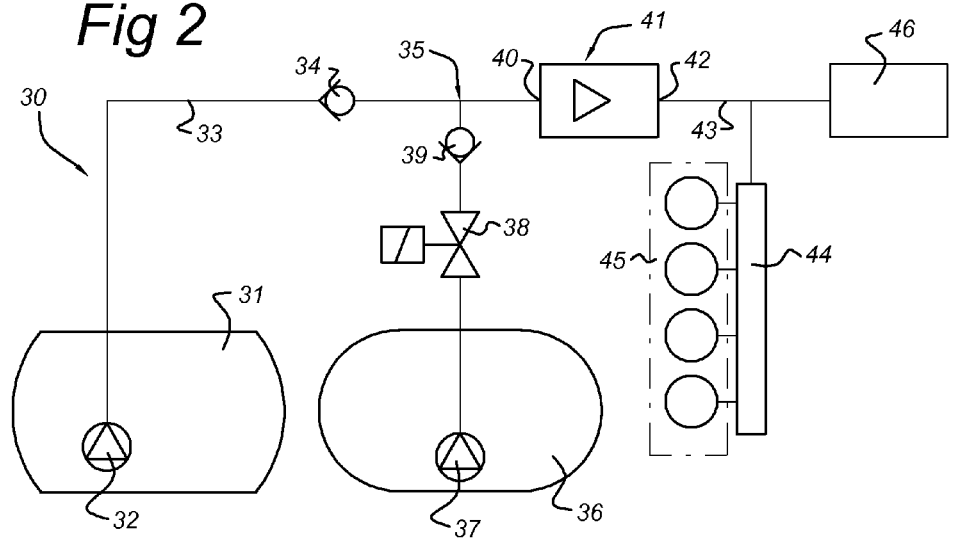
FIG. 2 shows a diagrammatic view of a second embodiment of a fuel supply system according to the invention.

FIG. 2 shows a second embodiment of a fuel supply system 30. The illustrated fuel supply system is a bi-fuel system. A first fuel supply 31 of liquid fuel, such as petrol, is illustrated, comprising a pump 32 and a line 33 which is connected to node 35 by a non-return valve 34. A second fuel supply 36 is likewise connected to node 35, for example a liquidized vapour or LPG supply 36 provided with a pump 37 which is connected to the node 35 by means of a controllable valve 38 and a non-return valve 39.

The desired fuel can be supplied to the inlet 40 of high-pressure pump 41 via a suitable control unit (not shown) and via node 35 so as to be pressurized there and then to reach the line 43 and high-pressure rail 44 via outlet 42 of high-pressure pump 41 in order to reach the respective combustion chambers 45.

The high-pressure pump 41 can be controlled via a central processing unit (not shown).

Again, a discharge unit 46 is connected to the downstream part of the high-pressure pump 41 in order to discharge any fuel, liquid or vapour, which may be present from such part. This can be controlled by means of the central processing unit (not shown). The discharge unit 46 may be opened temporarily in order to discharge fuel which is present. In particular, vaporized LPG from the high-pressure part of the fuel supply system 31 can be taken away, particularly when the LPG vaporized when the engine was stopped and the engine now has to be started again.

In one embodiment, switching on of the discharge unit 46 is controlled by the processing unit and is effected when the pre start phase takes place or based on the pre start phase. The pre start phase can be started, for example, by a door of a vehicle which comprises the fuel supply system 1 or 30 being opened.

Figure 3:
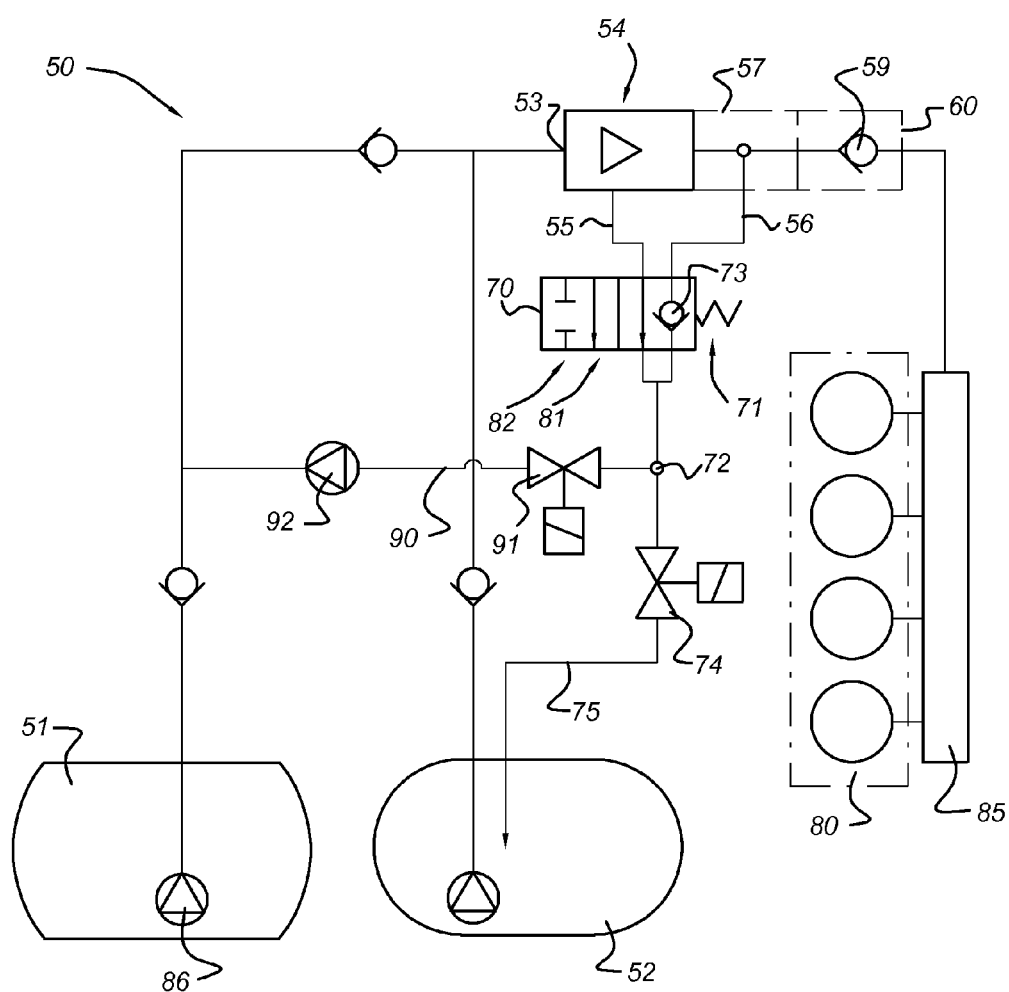
FIG. 3 shows a diagrammatic view of a third embodiment of a fuel supply system according to the invention.

FIG. 3 shows a third embodiment of a fuel supply system 50. The fuel supply system 50 is configured as a bi-fuel system. A liquid fuel supply 51 forms the low-pressure fuel part of a fuel supply system. The fuel supply 52 may contain LPG and thus forms the high-pressure fuel part of the fuel supply.

Both fuel supplies are connected to the inlet 53 of high-pressure pump 54 via suitable lines and non-return valves. High-pressure pump 54 has a first internal discharge or leakage line 55, which functions as a return for the high-pressure pump. In one embodiment, the return is connected to the low-pressure part of the high-pressure pump.

In another embodiment, the return is connected to a high-pressure part of the high-pressure pump 54.

In the illustrated embodiment, leakage line 55 is connected to the low-pressure part.

A second discharge 56 is situated downstream of the high-pressure pump 54, that is to say upstream of the high-pressure chamber of the high-pressure pump 54.

In one embodiment, the high-pressure pump 54 is provided internally with the discharge. This is illustrated with dashed lines 57.

In one embodiment, the high-pressure pump 54 also comprises the non-return valve 59, and this is illustrated with dashed lines 60. As a result thereof, reduction of the pressure upstream of this non-return valve 59 will have no effect downstream.

Leakage line 55 and discharge 56 are connected to a three/two valve 70. Three/two valve 70 is controllable 71 and is illustrated in FIG. 3 in a state (second mode), in which leakage line 55 is in open communication with node 72, while discharge 56 is closed in the direction of node 72 by a non-return valve 73. In the illustrated operating mode, the four-cylinder combustion engine 80 can work normally and excess fuel which has been supplied to inlet 53 via leakage line 55 can be returned via adjustable valve throttle 74 and return line 75 to, for example, the LPG supply 52. Leakage line 55 is particularly active during the supply of LPG fuel.

The three/two valve 70 can be switched to another state (first mode). In this state, discharge 56 becomes active, as the discharge 56 can be switched from the inhibited state to an open state. This is due to the fact that in the other state of three/two valve 70, discharge 56 will be connected to node 72 by means of line 81 in order to form a return line to supply 52 via the throttle 74/75.

In this mode, the leakage line 55 is actually closed off by means of connection 82.

The mode of two/three valve 70, in which the discharge 56 is active, can be switched on for a short time during start-up or during the pre start phase so that vapour present in the high-pressure part of the pump 54 can be discharged.

In the illustrated embodiment according to FIG. 3, there is no active discharge connected to the high-pressure rail 85. In another embodiment, this may instead be present or also be present.

FIG. 3 shows an embodiment in which a short-circuit route 90 via controllable valve 91 and a pump 92 is also provided. This short-circuit line 90 can be switched on when switching from LPG fuel to petrol fuel while the combustion engine 80 is running By allowing a discharge of fuel via leakage line 55, node 72 and the short-circuit line 90, the relatively high pressure of the LPG in the lines and inlet 53 of the high-pressure pump can be overcome despite the fact that the pressure in the fuel supply 51 and generated by the pump 86 is relatively low. Further development of the short-circuit system is illustrated in WO2009/110792.

Figure 4:
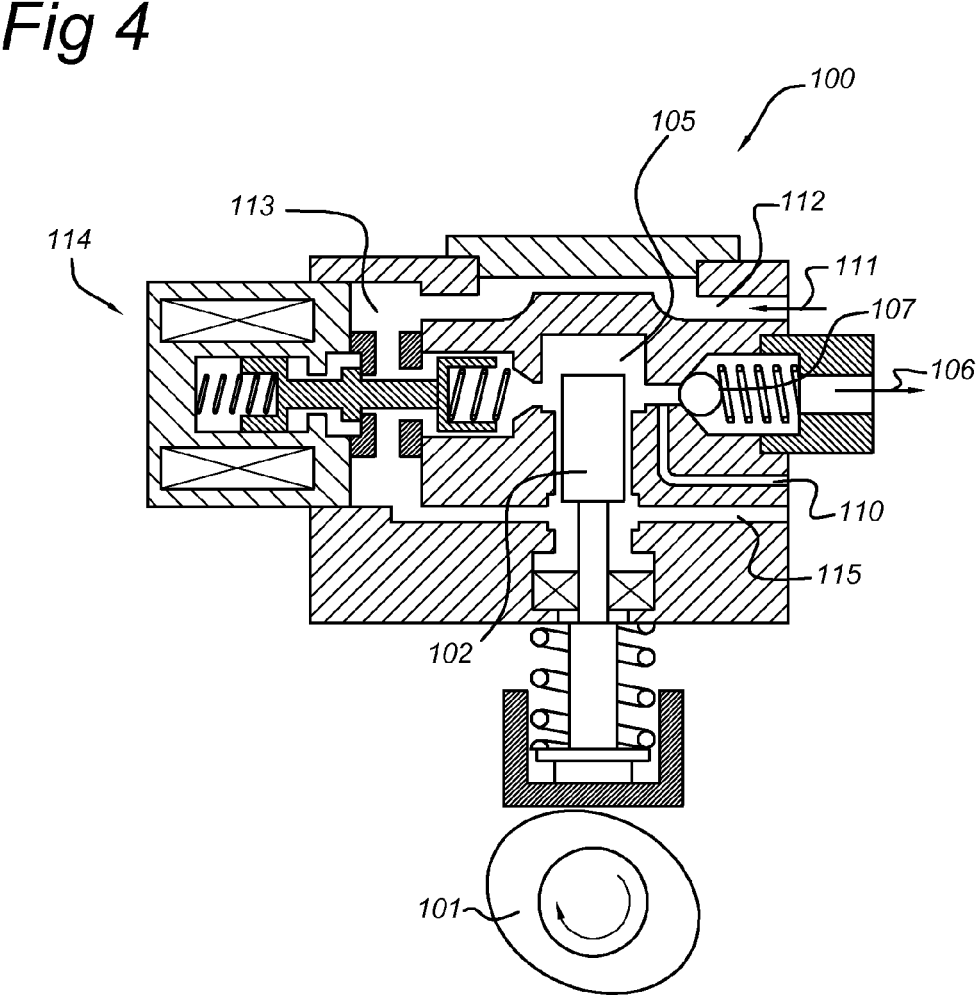
FIG. 4 shows a cross-sectional view of an embodiment of a high-pressure pump according to the invention.

FIG. 4 diagrammatically shows a cross section of a possible embodiment of a high-pressure pump 100. The known parts will not be discussed.

Via a suitable drive mechanism 101, a plunger 102 can be driven in order to pressurize fuel present in a high-pressure chamber 105 and to supply it, via discharge 106, to a high-pressure rail which is connected to said discharge 106.

The high-pressure pump 100 comprises a non-return valve 107. Upstream of the non-return valve 107, but downstream of the high-pressure chamber 105, a discharge 110 is formed.

The supply 111 is connected to a fuel supply, such as a fuel supply of a bi-fuel system. In the line 112, the fuel is taken to chamber 113 which also contains a controllable valve 114 which can switch access to the high-pressure chamber 105 on and off. Any excess of fuel which has been supplied via 111 can reach the return 115 via chamber 113.

By allowing a purging via line 110, vapour present in the high-pressure chamber 105 can be pumped out of the latter, for example during a pre start phase or a phase shortly before start-up of the engine. This prevents starting problems.

The invention claimed is:

1. A fuel supply system for injecting liquefied vapour under high pressure into a combustion chamber of an combustion engine, comprising a fuel supply for liquefied vapour, a first low-pressure connected to a second high-pressure pump via a conduit, wherein the second high-pressure pump comprises a high-pressure chamber which is embodied to thereby increase the pressure of the liquefied vapour, and wherein a high-pressure discharge of the second high-pressure pump is connected to a high-pressure rail which comprises one or several injectors for injecting liquefied vapour into a combustion chamber, wherein the fuel supply system is provided with a discharge unit for discharging vaporous fuel between the high-pressure chamber and the combustion chamber, wherein the fuel supply system is configured to discharge vaporous fuel from the discharge unit, wherein the second high-pressure pump has a first internal discharge connected to a low-pressure part of the second high-pressure pump and a second discharge downstream of the second high-pressure pump ,and wherein a short-circuit line comprising a controllable valve and a pump connects the first internal discharge and second discharge of the second high-pressure pump with the inlet of the second high-pressure pump.

2. A fuel supply system according to claim 1, wherein the discharge unit is at least connected to discharge fuel vapour from those parts of the fuel supply system positioned downstream of the second high-pressure pump in a non-fuel-consuming state of the internal combustion engine.

3. A fuel supply system according to claim 1, wherein the discharge unit is connected to discharge fuel from the high-pressure chamber of the second high-pressure pump.

4. A fuel supply system according to claim 1, wherein the discharge unit comprises a discharge line which is connected to the return line to the fuel supply.

5. A fuel supply system according to claim 1, wherein the discharge unit has a controllable valve, and is connected in particular to set the flow resistance of the discharge unit in a controllable manner.

6. A fuel supply system according to claim 1, comprising a non-return valve which is connected downstream of the high-pressure chamber and is connected to a control unit for thereby actuating said non-return valve, and in which the discharge unit is connected downstream of the non-return valve.

7. A fuel supply system according to claim 1, wherein the second high-pressure pump has a non-return valve downstream of the high-pressure chamber, and in which the discharge unit is connected to a duct which is positioned in the second high-pressure pump and upstream of the non-return valve.

8. A fuel supply system according to claim 1, wherein the second high-pressure pump, upstream of the high-pressure chamber, has a leakage line which is connected to the fuel supply.

9. A fuel supply system according to claim 8, wherein the leakage line is connected to the fuel supply via a return line.

10. A fuel supply system according to claim 9, wherein a return line of the fuel supply is connected to the discharge unit and the leakage line via a controllable valve.

11. A fuel supply according to claim 10, wherein the controllable valve is embodied to prevent flow from the low-pressure part to the fuel supply, as well as to allow flow through the discharge line to the fuel supply.

12. A fuel supply according to claim 10, wherein the controllable valve is embodied to allow flow from the low-pressure part to the fuel supply, as well as to prevent flow through the discharge line to the fuel supply.

13. A fuel supply system according to claim 1, wherein the fuel supply system comprises leak opening which is connected to the high-pressure chamber for generating a continuous flow of liquid vapour through the high-pressure chamber during operation of the internal combustion engine.

14. A fuel supply system according to claim 1, wherein the fuel supply system comprises a second fuel supply and wherein a control unit can switch between the supplies of the first fuel and the second fuel to an inlet of the second high-pressure pump.

15. A fuel supply system according to claim 1, wherein, downstream of the discharge unit for discharging vaporous fuel, in the high-pressure discharge or high-pressure rail, a non-return valve is fitted which maintains the pressure in the high-pressure rail.

16. A vehicle comprising an combustion engine and an associated fuel supply system according to claim 5, comprising a control unit for said controllable valve.

17. A vehicle according to claim 16, in which the control unit is embodied to open said valve during the start-up phase of said internal combustion engine.

18. A vehicle according to claim 17, comprising a door with an opening sensor, in which said start-up phase comprises said sensor emitting a signal.

19. A fuel supply system according to claim 1, wherein the first internal discharge and the second discharge are connected to a three/two controllable valve.

* * * * *